US012122154B2

(12) United States Patent
Nakano et al.

(10) Patent No.: US 12,122,154 B2
(45) Date of Patent: Oct. 22, 2024

(54) LIQUID EJECTION APPARATUS

(71) Applicant: BROTHER KOGYO KABUSHIKI KAISHA, Nagoya (JP)

(72) Inventors: Yasuhiro Nakano, Nagoya (JP); Yusuke Arai, Nagoya (JP); Tsuyoshi Ito, Nagoya (JP); Keisuke Yamamoto, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 17/531,938

(22) Filed: Nov. 22, 2021

(65) Prior Publication Data

US 2022/0169008 A1 Jun. 2, 2022

(30) Foreign Application Priority Data

Nov. 27, 2020 (JP) ................................ 2020-196531

(51) Int. Cl.

| | |
|---|---|
| ***B41J 2/045*** | (2006.01) |
| ***B41J 11/00*** | (2006.01) |
| ***B41J 29/393*** | (2006.01) |

(52) U.S. Cl.

CPC ....... *B41J 2/04505* (2013.01); *B41J 2/04573* (2013.01); *B41J 11/0095* (2013.01); *B41J 29/393* (2013.01)

(58) Field of Classification Search

None

See application file for complete search history.

(56) References Cited

U.S. PATENT DOCUMENTS

| | | | | |
|---|---|---|---|---|
| 7,533,959 B2 * | 5/2009 | Ouchi | B41J 11/0025 347/101 | |
| 2003/0035037 A1 * | 2/2003 | Mills | B41J 2/01 347/102 | |
| 2006/0221160 A1 | 10/2006 | Ouchi et al. | | |
| 2008/0150992 A1 * | 6/2008 | Endo | B41J 11/008 347/14 | |

(Continued)

FOREIGN PATENT DOCUMENTS

| | | |
|---|---|---|
| JP | H10138583 A | 5/1998 |
| JP | 2002-103720 A | 4/2002 |

(Continued)

OTHER PUBLICATIONS

Notice of Reasons for Refusal dated Aug. 6, 2024 received in Japanese Patent Application No. JP 2020-196531.

*Primary Examiner* — Alejandro Valencia

(74) *Attorney, Agent, or Firm* — Scully, Scott, Murphy & Presser, P.C.

(57) ABSTRACT

A liquid ejection apparatus includes a liquid ejection head, a sensor, a carriage, and a controller. The controller is configured to perform: setting a first sheet at a first printing position; printing an image on the first sheet while conveying the first sheet from the first printing position; determining whether an interval is more than a predetermined period; in a case where the interval is determined to be more than the predetermined period: causing the carriage to move in a first direction to a first detection position at which a second sheet is detected; and in response to detecting the second sheet, causing the carriage to move in the first direction to a first carriage position.

4 Claims, 11 Drawing Sheets

(56) References Cited

U.S. PATENT DOCUMENTS

| | | | | |
|---|---|---|---|---|
| 2011/0199412 | A1* | 8/2011 | Nakayama | B41J 29/38 347/14 |
| 2011/0227979 | A1 | 9/2011 | Morishita | |
| 2011/0267392 | A1 | 11/2011 | Borrell et al. | |
| 2016/0052308 | A1* | 2/2016 | Sahara | B41J 11/0095 347/16 |
| 2019/0283433 | A1* | 9/2019 | Arakane | B41J 11/02 |

FOREIGN PATENT DOCUMENTS

| | | | |
|---|---|---|---|
| JP | 2004-188944 | A | 7/2004 |
| JP | 2006273507 | A | 10/2006 |
| JP | 2008006793 | A | 1/2008 |
| JP | 2011189712 | A | 9/2011 |
| JP | 2016043495 | A | 4/2016 |

* cited by examiner

LIQUID EJECTION APPARATUS

CROSS-REFERENCE TO RELATED APPLICATION

This application claims priority from Japanese Patent Application No. 2020-filed on Nov. 27, 2020, the content of which is incorporated herein by reference in its entirety.

TECHNICAL FIELD

Aspects disclosed herein relate to a liquid ejection apparatus including a liquid ejection head that ejects liquid from a nozzle.

BACKGROUND

A known liquid ejection apparatus includes a carriage having a liquid ejection head mounted thereon. The liquid ejection apparatus receives first data, and prints an image based on the first data by causing the carriage to move in a scanning direction. The liquid ejection apparatus estimates a position of the carriage at which the carriage is to stop when the printing based on the first data is completed. If the liquid ejection apparatus receives second data before the printing based on the first data has not been completed, the liquid ejection apparatus estimates a position of the carriage at which the carriage is to stop based on the second data. Accordingly, the carriage is at the newly estimated position when the liquid ejection apparatus completes the recording based on the first data.

SUMMARY

Aspects of the disclosure provides a liquid ejection apparatus that may shorten a period between completion of printing based on the first data and completion of printing based on the second data.

In one or more aspects of the disclosure, a liquid ejection apparatus includes a liquid ejection head including a nozzle configured to eject liquid, a sensor configured to detect a first sheet and a second sheet each of which is conveyed in a conveying direction, a carriage configured to support the liquid ejection head and the sensor, and move in a scanning direction orthogonal to the conveying direction, the scanning direction including a first direction and a second direction opposite to the first direction, and a controller. The controller is configured to perform: setting the first sheet at a first printing position in response to conveying the first sheet in the conveying direction; printing an image on the first sheet while conveying the first sheet from the first printing position; determining whether an interval is more than a predetermined period, the interval indicating a period between a first timing at which the printing of the image on the first sheet is completed and a second timing at which the second sheet is set at a second printing position in response to conveying the second sheet in the conveying direction; in a case where the interval is determined to be more than the predetermined period: causing the carriage to move in the first direction to a first detection position at which the second sheet is detected; and in response to detecting the second sheet, causing the carriage to move in the first direction to a first carriage position.

In one or more aspects of the disclosure, A liquid ejection apparatus includes a liquid ejection head including a nozzle configured to eject liquid, a sensor configured to detect a first sheet and a second sheet each of which is conveyed in a conveying direction, a carriage configured to support the liquid ejection head and the sensor, and move in a scanning direction orthogonal to the conveying direction, the scanning direction including a first direction and a second direction opposite to the first direction, and a controller. The controller is configured to perform: setting the first sheet at a first printing position in response to conveying the first sheet in the conveying direction; printing an image on the first sheet while conveying the first sheet from the first printing position; determining a first moving period including a first detection period and a first preparation period, the first detection period indicating a period for causing the carriage to move from a print finishing position to a first detection position, the first preparation period indicating a period for causing the carriage to move from the first detection position to a first carriage position, the print finishing position being a position at which the printing of the image on the first sheet is completed, the first detection position being a position at which the second sheet is detected, the first carriage position being a position from which the printing of an image on the second sheet starts; determining a second moving period including a second detection period and a second preparation period, the second detection period indicating a period for causing the carriage to move from the print finishing position to a second detection position, wherein the first detection position is different from the second detection position, the second preparation period indicating a period for causing the carriage to move from the second detection position to a second carriage position, the second detection position being a position at which the second sheet is detected, the second carriage position being a position from which the printing of the image on the second sheet starts, wherein the first carriage position is different from the second carriage position; comparing the first moving period with the second moving period; in a case where the first moving period is less than the second moving period: causing the carriage to move in the first direction to the first detection position; and in response to detecting the second sheet, causing the carriage to move in the first direction to the first carriage position, and in a case where the first moving period is not less than the second moving period: causing the carriage to move in the second direction to the second detection position; and in response to detecting the second sheet, causing the carriage to move in the second direction to the second carriage position.

In one or more aspects of the disclosure, a liquid ejection apparatus configured to convey a sheet in a conveying direction includes a carriage movable in a first scanning direction and in a second scanning direction opposite to the first scanning direction, the first scanning direction and the second scanning direction being orthogonal to the conveying direction, a liquid ejection head disposed on the carriage, a sensor disposed on the carriage, and a controller. The controller is configured to perform: conveying a first sheet in the conveying direction until the first sheet reaches a first printing position; printing an image on the first sheet while conveying the first sheet from the first printing position; conveying the first sheet in response to the printing being completed; conveying a second sheet in the conveying direction until the second sheet reaches a second printing position; determining an interval between a first timing and a second timing, wherein the first timing is when the printing on the first sheet is completed, and the second timing is when a second sheet reaches the second printing position; determining whether the interval is greater than a particular value; in a case where it is determined that the interval is greater than the particular period, moving the carriage to move in the first scanning direction until the sensor detects the second sheet; and moving the carriage further in the first scanning direction to a first carriage position.

DETAILED DESCRIPTION

Figure 1:
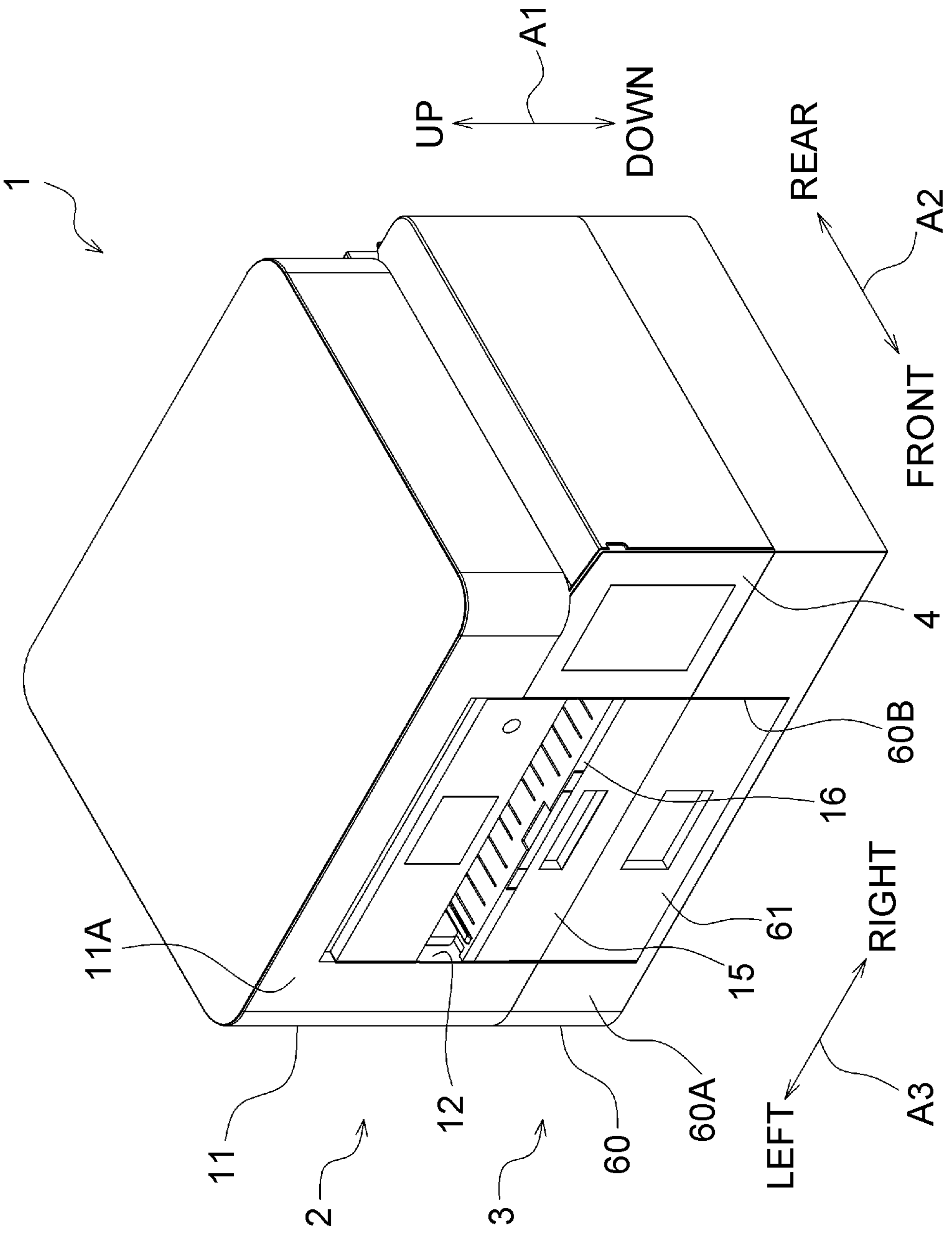
FIG. 1 is a perspective view of a printer according to one or more illustrative embodiments of the disclosure.

Hereinafter, a printer 1 according to one or more illustrative embodiments of the disclosure will be described. The printer 1 is used in a state illustrated in FIG. 1. As illustrated in FIG. 1, each direction A1, A2 and A3 is an up-down direction, a front-rear direction, and a left-right direction.

General Configuration of Printer

As illustrated in FIG. 1, the printer 1 has a substantially rectangular parallelepiped shape, and includes a main body 2 and an extension sheet feeding unit 3. The extension sheet feeding unit 3 is mounted on a lower portion of the main body 2. The main body 2 includes a housing 11. The housing 11 includes a front wall 11A that has an opening 12 around a center thereof. The housing 11 includes a first sheet feed tray 15 and a sheet discharge tray 16 arranged in the up-down direction A1. The first sheet feed tray 15 is detachable from the housing 11, i.e., insertable into and removable from the opening 12, in the front-rear direction A2. A sheet P1 having a certain size, e.g., A4, is disposed on the first sheet feed tray 15. The printer 1 is configured to communicate with an external device such as a personal computer (PC). The printer 1 is configured to execute printing process in response to receiving print data from the external device. The printer 1 is configured to execute various processes in response to manual operation by a user.

As illustrated in FIG. 1, the front wall 11A of the housing 11 has an opening cover 4 on the right side thereof. The opening cover 4 is rotatable about a rotational axis (not shown in figures) adjacent to a lower end thereof and extending along the left-right direction A3.

Internal Configuration of the Main Body 2

Figure 2:
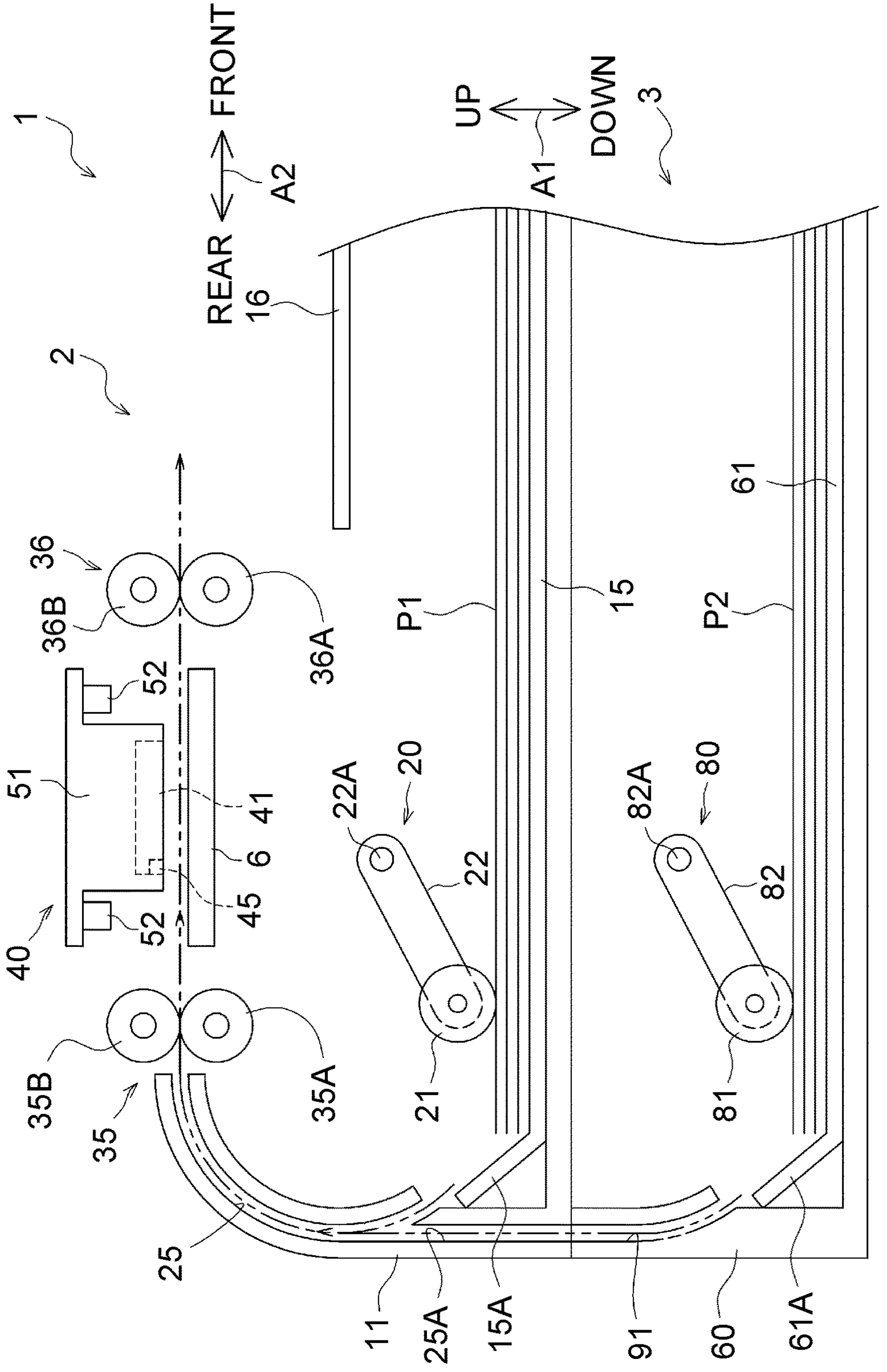
FIG. 2 is a general side view illustrating inside of the printer in FIG. 1 according to one or more illustrative embodiments of the disclosure.
Figure 3A:
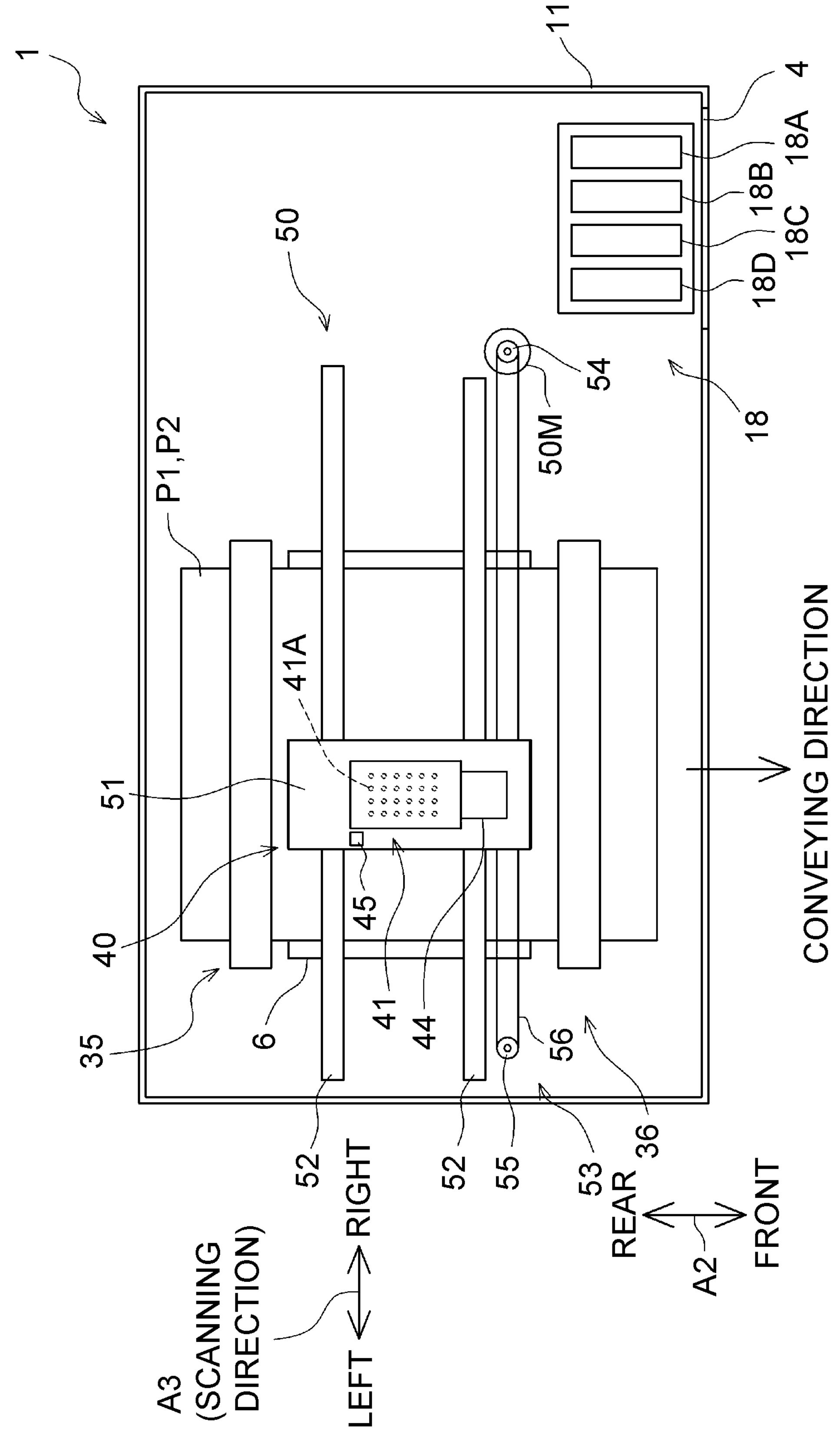
FIG. 3A is a general plane view of the printer in FIG. 1 according to one or more illustrative embodiments of the disclosure.

As illustrated in FIGS. 2 and 3A, the main body 2 includes a first sheet feed portion 20, a pair of conveying rollers 35, a recording unit 40, a tank unit 18, a pair of discharging rollers 36.

The first sheet feed portion 20 is configured to feed the sheet P1 on the first sheet feed tray 15 to a conveyance path 25. The pair of conveying rollers 35 is configured to convey the sheet P1 and a sheet P2 toward the recording unit 40. The recording unit 40 has a configuration such as an inkjet recording system. The recording unit 40 is configured to record an image on the conveyed sheets P1 and P2. The pair of discharging rollers 36 is configured to discharge the recorded sheets P1 and P2 to the sheet discharge tray 16.

Tank Unit 18

As illustrated in FIG. 3A, the printer 1 includes tank unit 18. The tank unit 18 includes four tanks 18A to 18D. Ink may be replenished to each four tank 18A to 18D by opening the opening cover 4. As illustrated in FIG. 3A, the four tanks 18A to 18D are located on a downstream side in a conveying direction of the main body 2, i.e., the front-rear direction A2, and on a right side. The four tanks 18A to 18D are arranged in a scanning direction, i.e., the left-right direction A3, which is orthogonal to a conveying direction. Black, yellow, cyan, and magenta inks are stored in the four tanks 18A to 18D in this order from the right side to the left side. The four color inks stored in the four tanks 18A to 18D are supplied to an inkjet head 41 via four tubes (not shown in figures).

First Sheet Feed Portion 20

As illustrated in FIG. 2, the first sheet feed portion 20 is located above the first sheet feed tray 15. The first sheet feed portion 20 includes a first feed roller 21 and a first arm 22. The first feed roller 21 is rotatably supported by a distal end of the first arm 22. The first arm 22 is pivotably supported by the support shaft 22A, and is urged by an urging portion such as a spring to be pivoted downward such that the first feed roller 21 contacts with the first sheet feed tray 15. The first arm 22 is configured to move upward when the first sheet feed tray 15 is attached or detached. The first feed roller 21 is configured to rotate by receiving a power of a first ASF motor 20M through a transmission mechanism. Accordingly, the sheet P1 stacked on the first sheet feed tray 15 is fed to the conveyance path 25.

First Sheet Feed Tray 15

As illustrated in FIG. 2, the first sheet feed tray 15 has an inclined wall 15A. The inclined wall 15A is configured to guide, to the conveyance path 25, the sheet P1 that is fed from the first sheet feed tray 15 by the first feed roller 21.

Conveyance Path 25

As illustrated in FIG. 2, the conveyance path 25 is included in the housing 11. The conveyance path 25 extends upward from a rear end of the first sheet feed tray 15, and is bent frontward. The sheet P1 fed from the first sheet feed tray 15 is guided by the conveyance path 25 from a lower side to the upper side so as to make a U-turn path, and reaches the recording unit 40.

Merging Path 25A

The conveyance path 25 is connected to the merging path 25A. The merging path 25A is included in the housing 11. The merging path 25A is located behind the first sheet feed tray 15, and extends in the up-down direction A1. The sheet P2 fed from the sheet feeding unit 3 is guided from the merging path 25A to the conveyance path 25. Then, the sheet P2 is guided from the lower side to the front side along the conveyance path 25, thereby reaching the recording unit 40.

Pair of Conveying Rollers 35, Pair of Discharging Rollers 36

The pair of conveying rollers 35 includes a conveying roller 35A disposed on the lower side and a pinch roller 35B disposed on the upper side. The conveying roller 35A is configured to rotate in accordance with a power of an LF motor 35M via a transmission mechanism. The pinch roller 35B is configured to rotate together with the rotation of the conveying roller 35A. The conveying roller 35A and the pinch roller 35B are configured to cooperatively sandwich the sheets P1 or P2 in the up-down direction A1, and convey the sheets P1 or P2 to the recording unit 40.

The pair of discharging rollers 36 includes a discharging roller 36A disposed on the lower side and a spur roller 36B disposed on the upper side. The discharging roller 36A is configured to rotate in accordance with a power of the LF motor 35M via the transmission mechanism. The spur roller 36B is configured to rotate together with the rotation of the discharging roller 36A. The discharging roller 36A and the spur roller 36B are configured to cooperatively sandwich the sheets P1 or P2 in the up-down direction A1, and convey the sheets P1 or P2 to the sheet discharge tray 16.

Recording Unit 40

As illustrated in FIGS. 2 and 3A, the recording unit 40 includes an inkjet head 41, a sensor 45, a carriage 51, a head moving mechanism 50, and a platen 6. The carriage 51 reciprocates in the scanning direction, i.e., the left-right direction A3 and orthogonal to the conveying direction. The inkjet head 41 is supported by the carriage 51.

The inkjet head 41 has a plurality of nozzles 41A at a lower surface thereof. The plurality of nozzles 41A is configured to eject ink toward the conveyed sheets P1 or P2 that is located below the inkjet head 41. As illustrated in FIG. 3A, four columns are arranged in the scanning direction. Each of the four columns extends in the conveying direction and includes one or more nozzles 41A. In this embodiment, black ink is ejected from one or more nozzles 41A included in the rightmost column in FIG. 3A. The color inks, i.e., magenta, cyan, and yellow, are ejected from the one or more nozzles 41A in the other three columns. The inkjet head 41 ejects ink of each color from each nozzle 41A as a small amount of droplet.

The inkjet head 41 is connected to a tube joint 44. The tube joint 44 is connected to four flexible tubes (not shown in figures). Accordingly, the inkjet head 41 and the tank unit 18 are configured to communicate with each other via the four tubes, and ink of each color is supplied from the tank unit 18 to the inkjet head 41.

The platen 6 is located below the inkjet head 41. The platen 6 is configured to support the sheets P1 and P2 that are conveyed by the pair of conveying rollers 35. The platen 6 has a width in the scanning direction that is less than a width of reciprocating movement of the carriage 51. The width of the platen 6 is sufficiently more than a width of each sheet P1 and P2, thereby enabling the conveyed sheets P1 and P2 to pass over the platen 6.

Figure 3B:
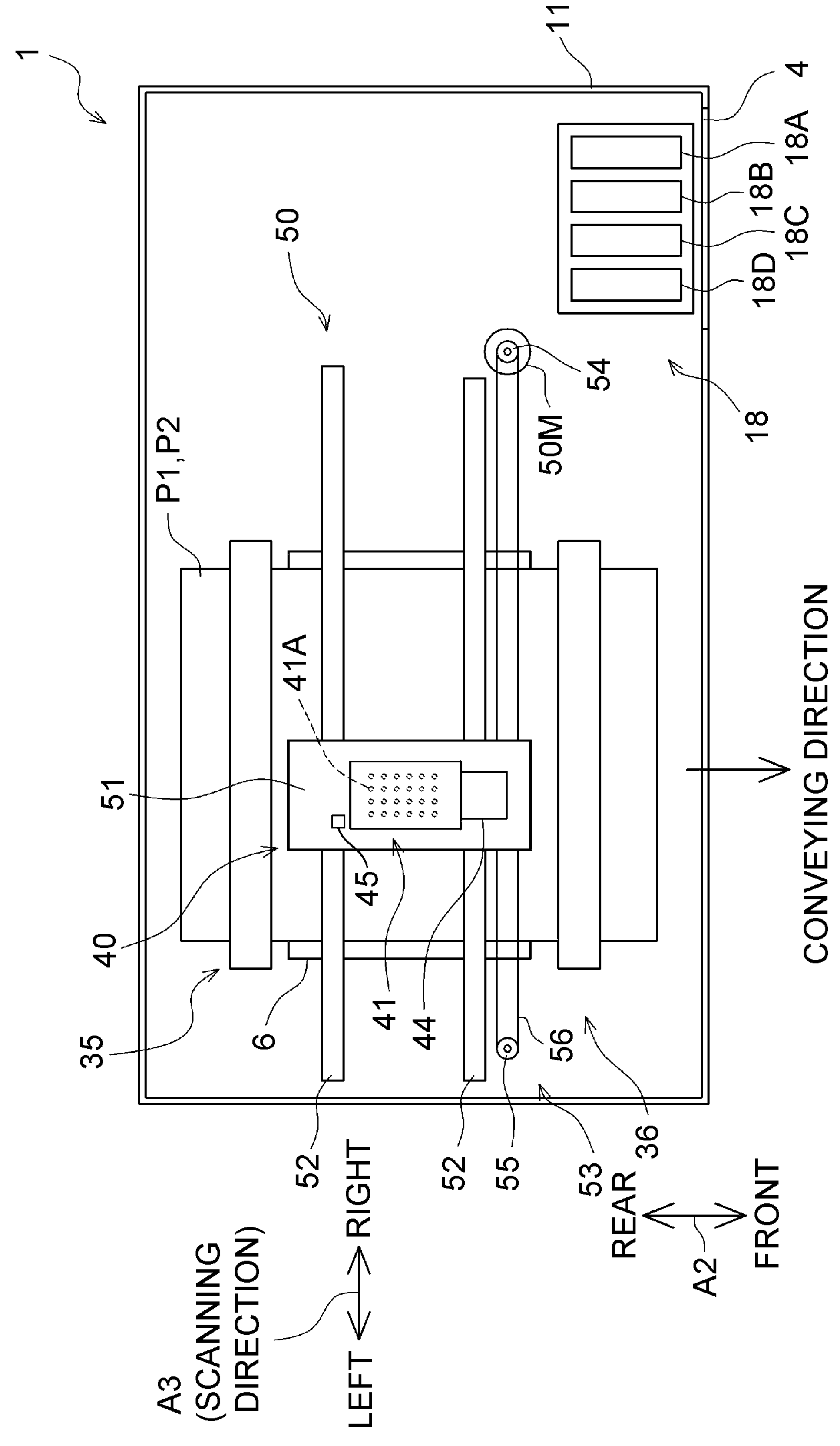
FIG. 3B is a general plane view of the printer in FIG. 1 according to one or more illustrative embodiments of the disclosure.
Figure 3C:
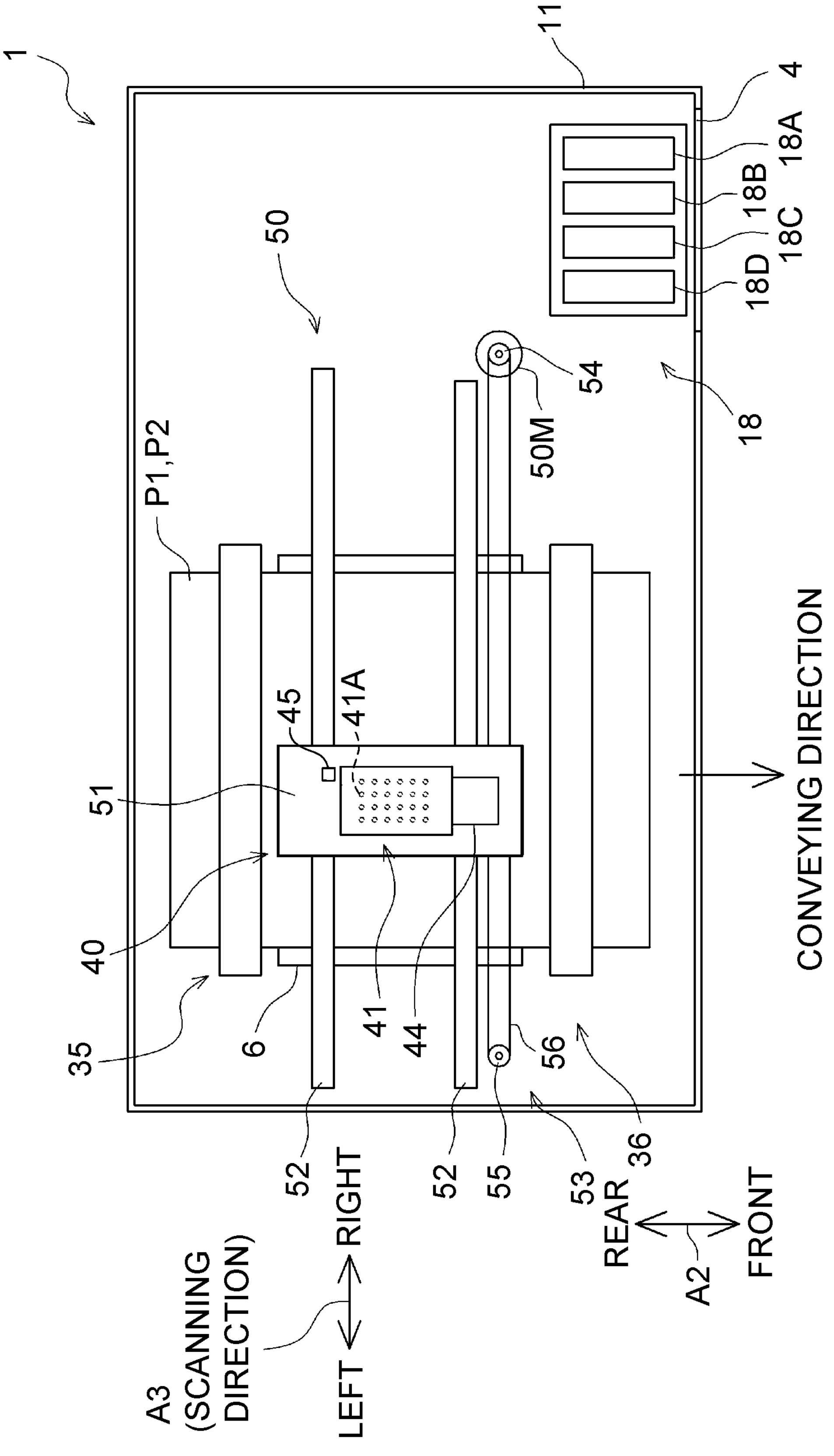
FIG. 3C is a general plane view of the printer in FIG. 1 according to one or more illustrative embodiments of the disclosure.
Figure 3D:
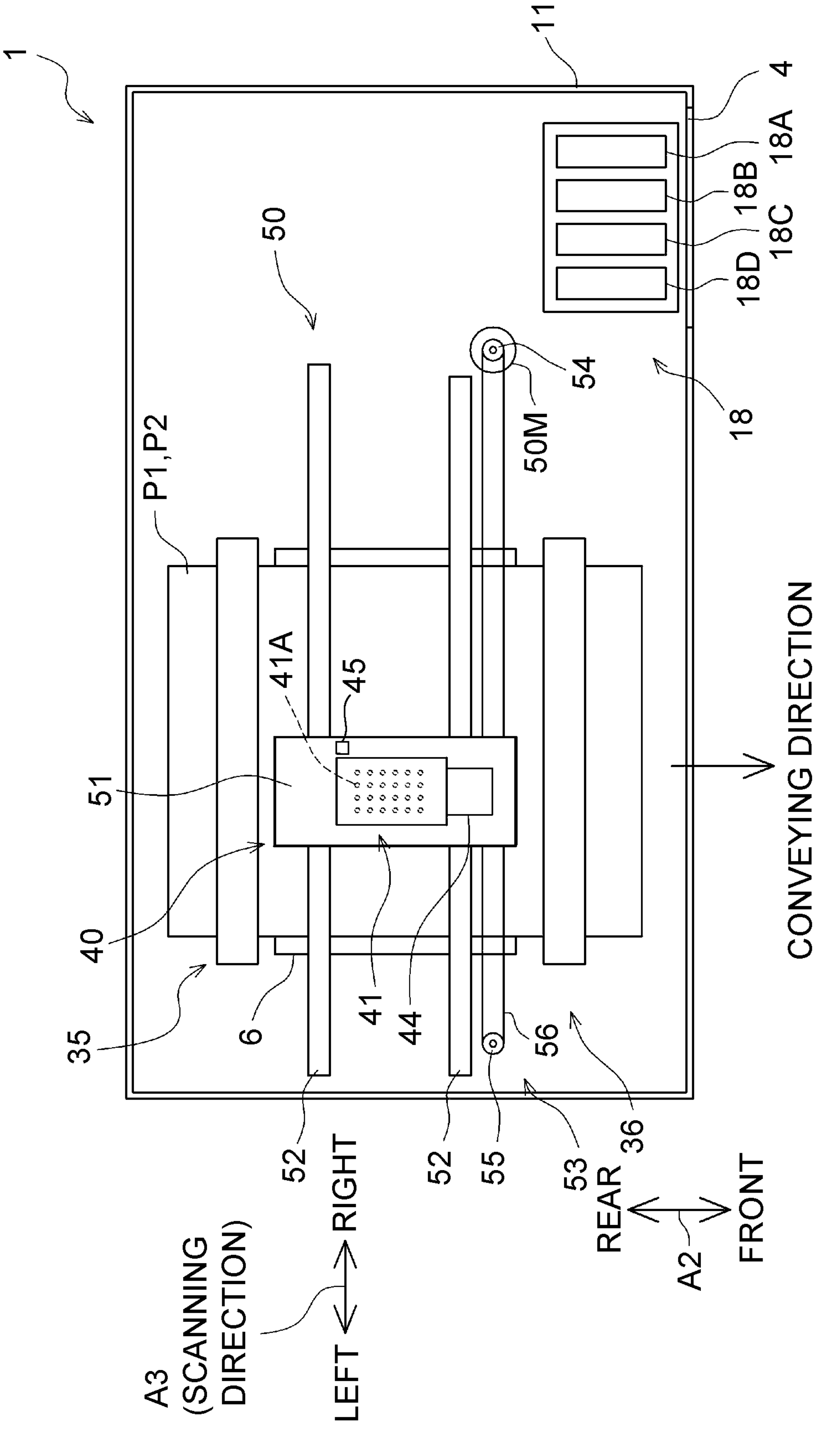
FIG. 3D is a general plane view of the printer in FIG. 1 according to one or more illustrative embodiments of the disclosure.

As illustrated in FIG. 3A, the sensor 45 is supported by the carriage 51. The sensor 45 is located on a left side in the left-right direction A3 with respect to the plurality of nozzles 41A. In this embodiment, the sensor 45 is located on an upstream side in the conveying direction with respect to all of the plurality of nozzles 41A and on the left side of the inkjet head 41. Nevertheless, the sensor 45 may be located on the upstream side in the conveying direction with respect to the inkjet head 41 as illustrated in FIGS. 3B and 3C, and the sensor 45 may be located on an upstream side in the conveying direction with respect to all of the plurality of nozzles 41A and on the right side of the inkjet head 41 as illustrated in FIG. 3D. In FIGS. 3A and 3D, the sensor 45 may be located on the upstream side with respect to at least one of the nozzles 41A. The sensor 45 is a known optical sensor. Nevertheless, the sensor 45 may be another type of sensor that can detect the sheets P1 and P2 conveyed between the inkjet head 41 and the platen 6. The sensor 45 has a light emitter and a light receiver. The light emitter is configured to emit light downward. The light receiver is configured to receive light reflected from the platen 6, the sheets P1 or P2. The sensor 45 can detect the presence of the sheets P1 and P2 based on the difference between the amount of light reflected from the platen 6 and the amount of light reflected from the sheets P1 and P2.

As illustrated in FIG. 3A, the head moving mechanism 50 includes a pair of guide rails 52 and a belt transmission mechanism 53. The pair of guide rails 52 are spaced apart from each other in the front-rear direction A2, and extend parallel to each other in the left-right direction A3. The carriage 51 spreads across the pair of guide rails 52, and is configured to reciprocate along the left-right direction A3 on the pair of guide rails 52.

The belt transmission mechanism 53 includes two pulleys 54 and 55, an endless timing belt 56 partially fixed to the carriage 51, and a carriage motor 50M. The two pulleys 54 and 55 are spaced apart from each other in the left-right direction A3. The timing belt 56 is looped around the pulleys 54 and 55. The pulley 54 is connected to the driving shaft of the carriage motor 50M. The carriage 51 including the inkjet head 41 is configured to move in the scanning direction in response to the timing belt 56 running by driving the carriage motor 50M.

The inkjet head 41 is configured to eject ink of each color from the plurality of nozzles 41A. That is, the inkjet head 41 is scanned on the sheets P1 or P2 and ejects ink of each color from the nozzle 41A while the carriage 51 reciprocates in the left-right direction A3, thereby recording an image on the sheets P1 or P2 on the platen 6. The printer 1 includes a linear encoder (not shown in the figures) having a plurality of slits arranged at intervals in the scanning direction. On the other hand, the carriage 51 includes a transmission type of position detection sensor (not shown in the figures) having a light emitter and a light receiver. The printer 1 is configured to recognize a current position of the carriage 51 in the scanning direction based on a count value of the slits of the linear encoder that is detected by the position detection sensor during the movement of the carriage 51. This recognition enables to control a rotational drive of the carriage motor 50M.

Sheet Feeding Unit 3

As illustrated in FIGS. 1 and 2, the sheet feeding unit 3 includes a housing 60, a second sheet feed tray 61, a second feeding portion 80. As illustrated in FIG. 1, the housing 60 has a substantially rectangular parallelepiped shape, and is detachably mounted on a lower portion of the main body 2. The housing 60 includes a front wall 60A that has an opening 60B around a center thereof. The second sheet feed tray 61 is detachable from the housing 60, i.e., insertable into and removable from the opening 60B, in the front-rear direction A2.

Second Sheet Feed Tray 61

As illustrated in FIG. 2, the second sheet feed tray 61 is configured to hold a sheet P2 having a certain size, e.g., A4, that is placed thereon. The second sheet feed tray 61 has an inclined wall 61A at a rear end thereof. The inclined wall 61A is configured to guide, toward the merging path 25A, the sheet P2 that is fed by the second feed roller 81.

Second Sheet Feeding Portion 80

As illustrated in FIG. 2, the second sheet feeding portion 80 is located above the second sheet feed tray 61. The second sheet feeding portion 80 includes a second feed roller 81 and a second arm 82. The second feed roller 81 is rotatably supported by a distal end of the second arm 82. The second arm 82 is pivotably supported by the support shaft 82A, and is urged by an urging portion such as a spring to be pivoted downward such that the second feed roller 81 contacts with the second sheet feed tray 61. The second arm 82 is configured to move upward when the second sheet feed tray 61 is attached or detached. The second sheet feed roller 81 is configured to rotate by receiving a power of a second ASF motor 80M through a transmission mechanism. Accordingly, the sheet P2 stacked on the second sheet feed tray 61 is fed to the merging path 25A via the conveyance path 91.

Conveyance Path 91

As illustrated in FIG. 2, the conveyance path 91 is included in the housing 60. The conveyance path 25 is bent upward from a rear end of the second sheet feed tray 61. An upper end of the conveyance path 91 is connected to a lower end of the merging path 25A in response to attaching the sheet feeding unit 3 to the main body 2. The sheet P2 fed from the second sheet feed tray 61 is guided to the merging path 25A via the conveyance path 91.

Figure 4:
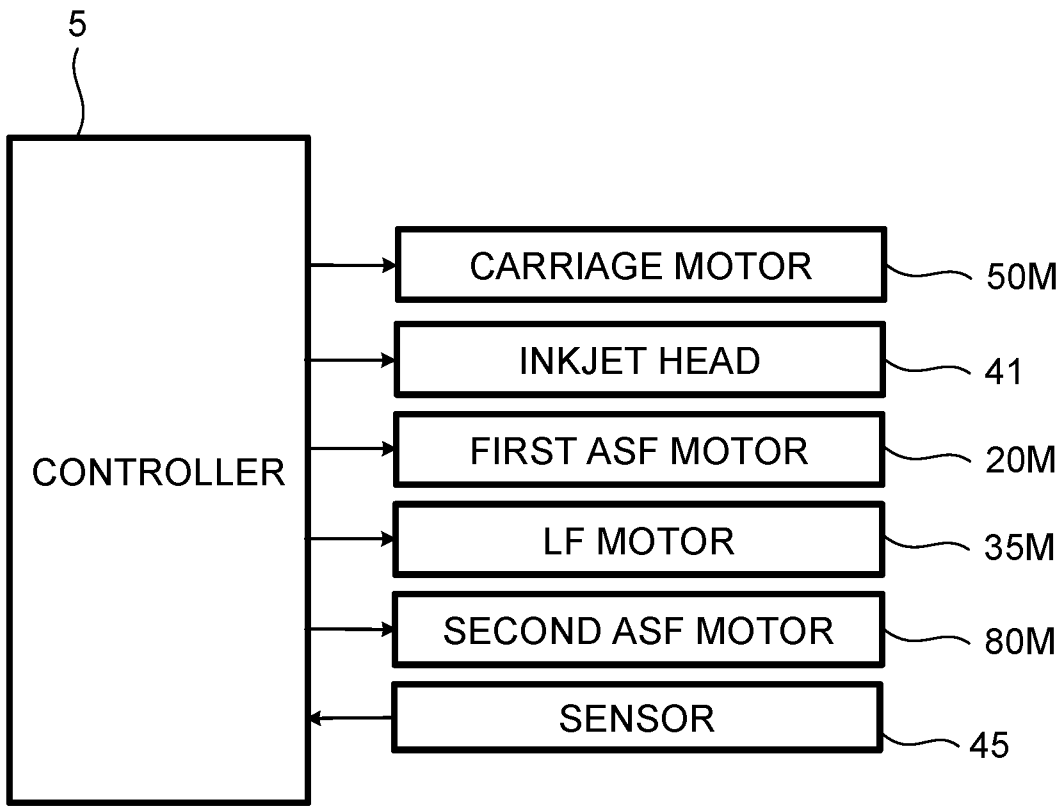
FIG. 4 is block diagram of a controller of the printer according to one or more illustrative embodiments of the disclosure.

As illustrated in FIG. 4, the controller 5 includes a Central Processing Unit (CPU), Read Only Memory (ROM), Random Access Memory (RAM), Application Specific Integrated Circuit (ASIC), which cooperate with each other to control the first ASF motor 20M, the second ASF motor 80M, the LF motor 35M, the carriage motor 50M, and the inkjet head 41. For example, the controller 5 is configured to control the inkjet head 41, the first ASF motor 20M, the LF motor 35M, and the carriage motor 50M to record an image on the sheet P1. For another example, the controller 5 is configured to control the inkjet head 41, the second ASF motor 80M, the LF motor 35M, and the carriage motor 50M to record an image on the sheet P2.

In this embodiment, the controller 5 includes a single CPU and a single ASIC. Nevertheless, the controller 5 may include either of the single CPU and the single ASIC that may collectively perform necessary processing. The controller 5 may include a plurality of CPUs that may share the necessary processing. The controller 5 may include a plurality of ASICs that may share the necessary processing. The controller 5 is configured to communicate with a sensor 45.

Figure 5:
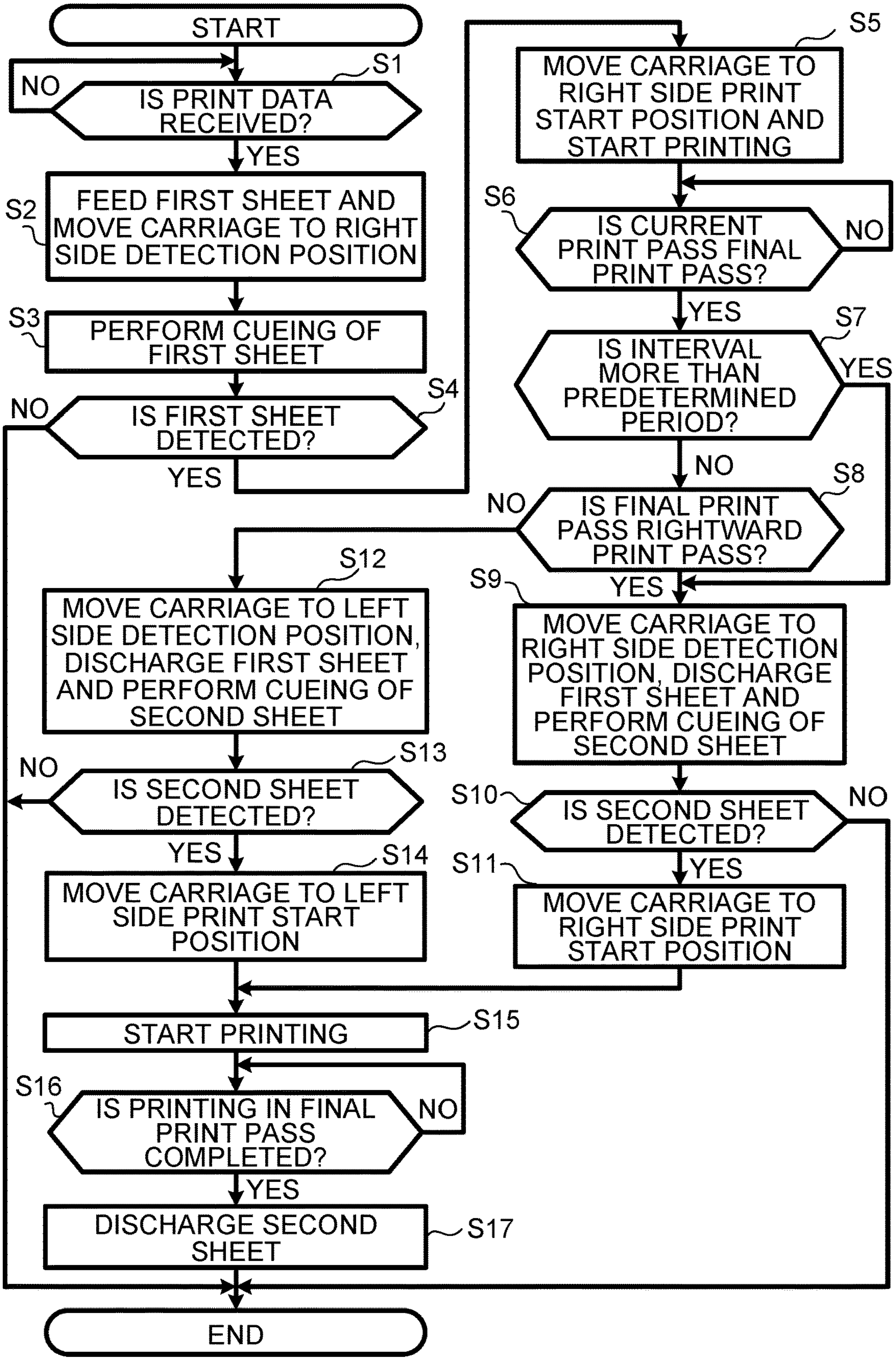
FIG. 5 is a flowchart illustrating printing operations of the printer according to one or more illustrative embodiments of the disclosure.
Figure 6A:
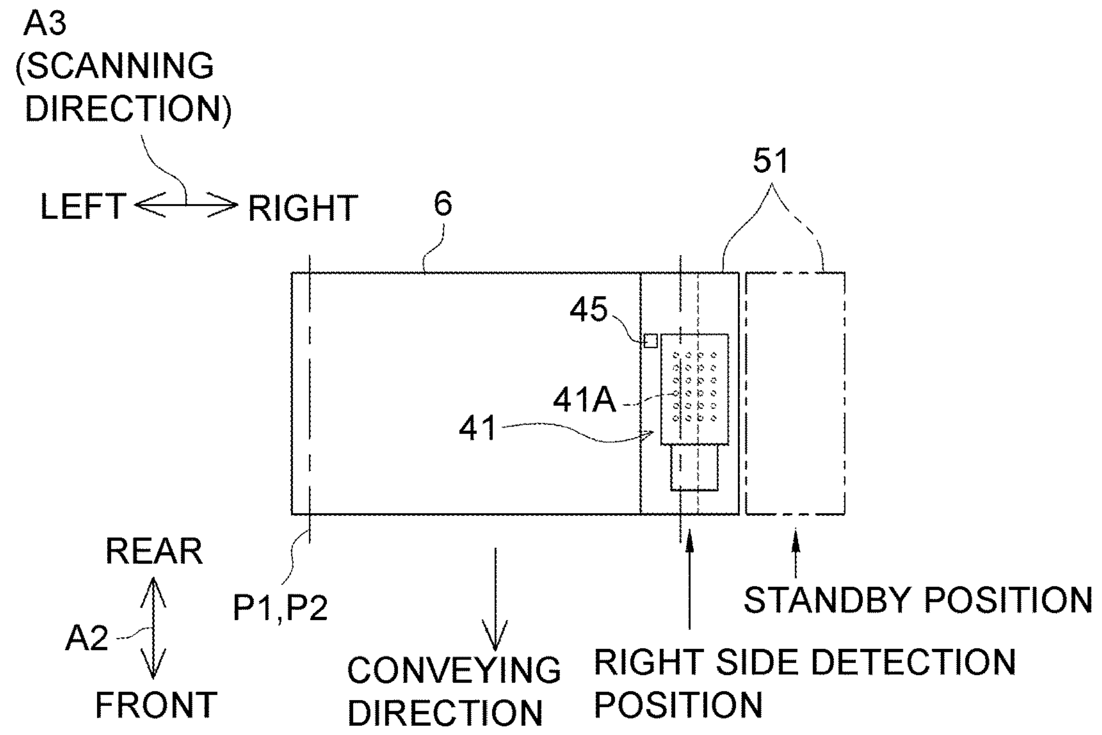
FIG. 6A is a diagram illustrating a state in which a carriage is at a right side detection position according to one or more illustrative embodiments of the disclosure.
Figure 6B:
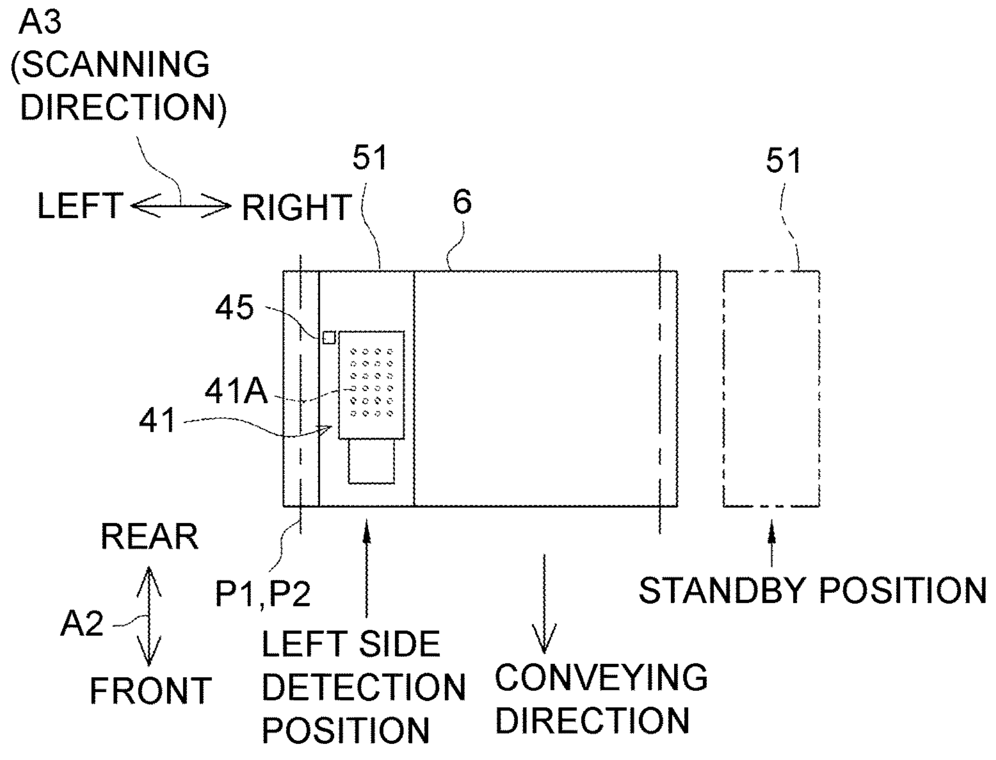
FIG. 6B is a diagram illustrating a state in which the carriage is at a left side detection position according to one or more illustrative embodiments of the disclosure.

Hereinafter, the printing operation of the printer 1 will be described with reference to FIGS. 5 to 7. As illustrated in FIG. 5, in S1, the controller 5 determines whether the print data is received. If the controller 5 determines that the print data is not received (NO in S1), the controller repeats the determination of S1. If the controller 5 determines that the print date is received (YES in S1), the controller 5 proceeds to a step S2. The carriage 51 is disposed at a standby position until the controller 5 proceeds to the step S2. The print data includes first print data and second print data. The first print data is for printing an image on a first sheet. The second print data is for printing an image on a second sheet that is conveyed next to the first sheet. In this embodiment, each of the first sheet and the second sheet is the sheet P1 that is fed by the first sheet feed portion 20. Nevertheless, at least one of the first sheet and the second sheet may be the sheet P2 that is fed by the second feeding portion 80. In this embodiment, the print data is received from the external device such as the PC. Alternatively, the print data may be read from a storage medium such as an external memory inserted to the printer 1.

In S2, the controller 5 controls the first ASF motor 20M, thereby causing the first sheet feed portion 20 to feed the sheet P1 on the first sheet feed tray 15 (hereinafter also referred to as a first sheet P1) toward the pair of conveying rollers 35. The sheet P1 is set at an initial position in the conveying direction when a downstream end of the sheet P1 contacts with the pair of conveying rollers 35A, thereby performing leading edge registration.

In S2, the controller 5 controls the carriage motor 50M, thereby causing the carriage 51 to move from the standby position to a right side detection position. The right side detection position is an example of a “first detection position”. Nevertheless, the controller 5 may control the carriage motor 50M to cause the carriage 51 to move to a left side detection position in a case where an initial printing position from which printing an image on the sheet P1 starts is located on a left side of the sheet P1 in the left-right direction A3. The left side detection position is an example of a “second detection position”. The standby position is a position indicated by an alternate long and two short dashes line in FIG. 6A. The standby position is a position where the carriage 51 does not overlap the platen 6, and on a right side of the platen 6 in the left-right direction A3. The right side detection position is a position indicated by a solid line in FIG. 6A. The right side detection position is a position where a part of the carriage 51 overlaps with the platen 6, and where the sensor 45 may overlap with a right end portion of each conveyed sheets P1 and P2. The left side detection position is a position indicated by a solid line in FIG. 6B. The left side detection position is a position where the carriage 51 entirely overlaps the platen 6, and where the sensor 45 may overlap with a left end portion of each conveyed sheets P1 and P2.

In S3, the controller 5 performs cueing of the first sheet P1. The controller 5 controls the LF motor 35M to cause the pair of conveying rollers 35 to convey the first sheet P1 to a print start position. From the print start position, printing for the first print pass starts in which the inkjet head 41 ejects ink while moving the carriage 51. The print start position of the first sheet P1 is an example of a “first printing position”.

In S4, the controller 5 determines whether the cued first sheet P1 is detected. The controller 5 determines that the cued first sheet P1 is not detected based on a detection result of the sensor 45 not detecting the first sheet P1. If the controller 5 determines that the cued first sheet P1 does is not detected (NO in S4), the controller 5 notifies an error such as a failure of the sensor and a sheet jam, and ends the processing of FIG. 5. Nevertheless, the controller 5 may restart the processing from the step S2 after the notification. If the controller 5 determines that the cued first sheet P1 is detected (YES in S4), the controller 5 proceeds to a step S5.

Figure 7A:
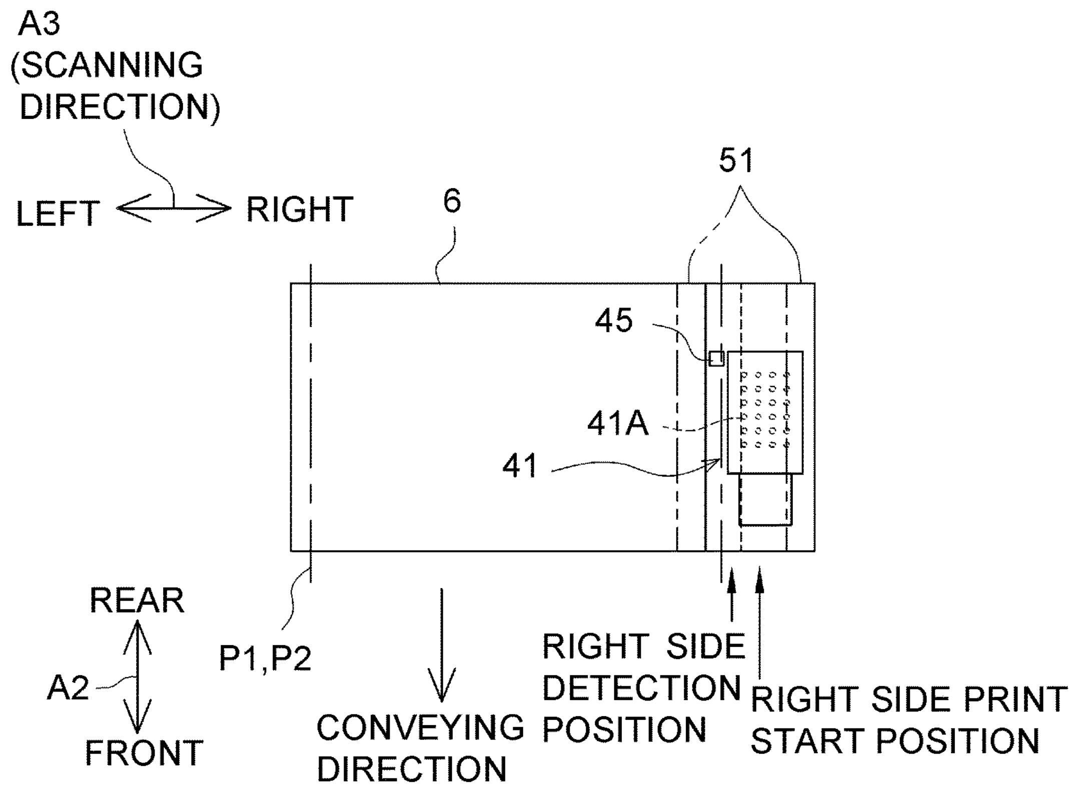
FIG. 7A is a diagram illustrating a state in which the carriage is at a right side print start position according to one or more illustrative embodiments of the disclosure.
Figure 7B:
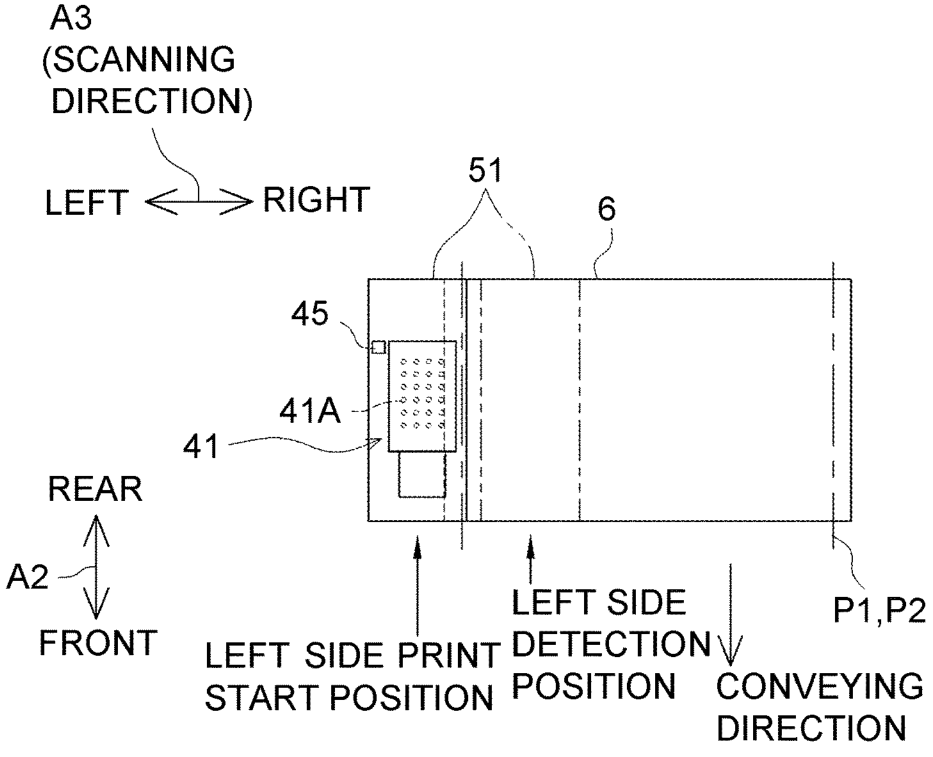
FIG. 7B is a diagram illustrating a state in which the carriage is at a left side print start position according to one or more illustrative embodiments of the disclosure.

In S5, the controller 5 controls the carriage motor 50M to cause the carriage 51 to move from the right side detection position to a right side print start position. The right side print start position is an example of a “first carriage position”. Nevertheless, if the carriage 51 is at the left side detection position, the controller 5 may cause the carriage 51 to move from the left side detection position to a left side print start position. The left side print start position is an example of a “second carriage position”. As illustrated in FIG. 7A, the right side print start position is located at a right side of the right detection position. The right side print start position is a position where the carriage 51 partially overlaps the platen 6, and any of the nozzles 41A do not overlap the sheets P1 and P2. As illustrated in FIG. 7B, the left side print start position is located at a left side of the left detection position. The left side print start position is a position where the carriage 51 partially overlaps the platen 6, and any of the nozzles 41A do not overlap the sheets P1 and P2. A moving distance of the carriage 51 between the right side detection position and the right side print start position is less than a moving distance of the carriage 51 between the left side detection position and the left side print start position. Accordingly, a moving period of the carriage 51 between the right side print start position and the right side detection position is less than a moving period of the carriage 51 between the left side print start position and the left side detection position.

In response to moving the carriage to the right side print start position, the controller 5 controls the carriage motor 50M, the inkjet head 41, and the LF motor 35M to print an image on the first sheet P1. The controller 5 prints an image on the first sheet P1 by alternately performing an ink discharging operation and a conveyance operation. In the ink discharging operation, the controller 5 controls the inkjet head 41 to eject ink from the plurality of nozzles 41A. In the conveyance operation, the controller 5 controls the pair of conveying rollers 35 and the pair of discharging rollers 36 to convey the first sheet P1 forward by a predetermined amount of length. The controller 5 performs bidirectional printing in which ink is ejected from the inkjet head 41 while the carriage 51 moves rightward and leftward in the left-right direction A3.

In a case where the controller 5 causes the carriage 51 to move leftward from the right side print start position, the controller 5 causes the carriage 51 to accelerate moving leftward until the carriage 51 reaches a predetermined speed, and to move leftward at a constant predetermined speed after the carriage 51 reaches the predetermined speed. In a case where the controller 5 causes the carriage 51 to move rightward from the left side print start position, the controller 5 causes the carriage 51 to accelerate moving rightward until the carriage 51 reaches a predetermined speed, and to move rightward at the constant predetermined speed when the carriage 51 reaches the predetermined speed. In each case, the controller 5 controls the carriage 51 to decelerate moving in response to finishing printing an image in each pass based on the first print data, and stop at a predetermined position. The predetermined position is located at a position away from an end in the scanning direction toward which the carriage 51 moves in immediately preceding print pass such that the carriage 51 is accelerated to a predetermined speed, and is close to a position from which ink is discharged to a next print pass. After this ink discharging operation for a single print pass, the controller 5 executes the conveyance operation. In response to execution of the conveyance operation, the controller 5 executes the ink discharging operation for the next print pass by ejecting ink while the controller 5 controls the carriage 51 to move toward opposite direction in the scanning direction. Accordingly, the image based on the first print data is printed on the first sheet P1.

In S6, the controller 5 determines whether a current print pass for the first sheet P1 is a final print pass. If the controller 5 determines that the current print pass is not the final print pass (NO in S6), the controller 5 continues printing process and repeats the step S6. On the other hand, if the controller 5 determines that the current print pass is the final print pass (YES in S6), the controller 5 proceeds to a step S7.

In S7, the controller 5 executes a determination process. The determination process is for determining whether an interval is more than a predetermined period. The interval is a period between a first timing and a second timing. From the first timing, the first sheet P1 is discharged in response to finishing printing process for the first sheet P1. At the second timing, a sheet P1 that is conveyed next to the first sheet P1 (hereinafter also referred to as a second sheet P1) is set at the print start position. In the determination process of S7, the controller 5 determines whether the interval is more than the predetermined period based on the following three conditions, i.e., a first condition, a second condition, and a third condition. This determination process of S7 is executed in parallel with the printing process of the step S5 and S6 except for printing in the final print pass.

First condition is a condition in which a conveyance amount of the first sheet P1 conveyed in a period between a timing of the leading edge registration of the first sheet P1 and a timing of completion of printing in the final print pass for the first sheet P1 is equal to or less than a length of the first sheet P1 in the conveying direction. First condition indicates that the first sheet P1 is being nipped by the pair of conveying rollers 35 at a timing when the controller 5 completes printing on the first sheet P1, and that the pair of conveying rollers 35 is being driven to convey the first sheet P1. Thus, in the first condition, the first sheet P1 is conveyed to some extent before the second sheet P1 is fed, thereby delaying a start of feeding of the second sheet P1. In the first condition, feeding of the second sheet P1 starts when the controller 5 starts printing in the final print pass of a plurality of printing pass.

On the other hand, the first condition is not satisfied in a case where an upstream end of the first sheet P1 has already passed through the pair of conveying rollers 35 when printing on the first sheet P1 is completed. In a case where the first condition is not satisfied, the start of feeding of the second sheet P1 does not delay, whereby waiting time for discharging the first sheet P1 is not needed. In the case where the first condition is not satisfied, feeding of the second sheet P1 starts when the controller 5 starts printing in a print pass before, or immediately before, the final print pass of the plurality of print pass. Delay of the start of feeding of the second sheet P1 causes a certain waiting period, thereby causing the interval to be long. If the controller 5 determines that the first condition is satisfied (YES in S7), the controller 5 proceeds to a step S9. The predetermined period in this embodiment is a period during which the carriage 51 can be moved to the right side detection position by the time the second sheet P1 is conveyed to the print start position even if the print end position of the carriage 51 after printing for the first sheet P1 is at a position farthest in the left-right direction A3 from the right side detection position. The print end position of the carriage 51 disposed after printing for the first sheet P1 is a position located when ejection of ink from the inkjet head 41 in the final print pass for the first sheet P1 is completed. On the other hand, if the controller 5 determines that the first condition is not satisfied (NO in S7), the controller 5 proceeds to a step S8.

The second condition is a condition in which the conveying amount of the second sheet P1 conveyed in a period between a timing of the leading edge registration of the second sheet P1 and a timing when the second sheet is conveyed to the print start position is equal to or less than a predetermined length. In this embodiment, the predetermined length is one fourth of the length of the second sheet P1. In a case where the second sheet P1 is conveyed by the predetermined length, the conveyance time becomes long enough to cause the carriage 51 to move to the right side detection position by the second sheet P1 being conveyed to the print start position even if the print end position of the carriage 51 after printing for the first sheet P1 is at a position farthest in the left-right direction A3 from the right side detection position. If the controller 5 determines that the second condition is satisfied (YES in S7), the controller 5 proceeds to the step S9. The predetermined length of the second sheet P1 is not limited to one fourth of the length of the second sheet P1. On the other hand, if the controller 5 determines that the second condition is not satisfied (NO in S7), the controller 5 proceeds to the step S8.

The third condition is a condition in which the sheet P2 fed by the second feeding portion 80 is conveyed next to the first sheet P1. The second feeding portion 80 is located in the sheet feeding unit 3 for extension. A conveying distance from the second feeding portion 80 to the pair of conveying rollers 35 may be significantly more than a conveying distance from the first sheet feed portion 20 to the pair of conveying rollers 35. Accordingly, the feeding period between start of feeding of the sheet P2 and arrival at the pair of conveying rollers 35 is more than the predetermined feeding time. If the controller 5 determines that the third condition is satisfied (YES in S7), the controller 5 proceeds to the step S9. On the other hand, if the controller 5 determines that the third condition is not satisfied (NO in S7), the controller 5 proceeds to the step S8.

In S8, the controller 5 determines whether the final print pass for the first sheet P1 is a rightward print pass in which the carriage moves rightward. If it is determined that the final print pass is the rightward print pass (YES in S8), the controller 5 proceeds to a step S9. If it is determined that the final print pass is not the rightward print pass (NO in S8), i.e., a leftward print pass in which the carriage moves leftward, the controller 5 proceeds to a step S12.

In S9, the controller 5 controls the carriage motor 50M to cause the carriage 51 to move from a print end position where printing in the final print pass is completed to the right side detection position. In parallel with moving of the carriage 51, the controller 5 performs the discharging operation of the first sheet P1 and cueing of the second sheet P1. The controller 5 controls the first ASF motor 20M and the LF motor 35M to cause the pair of discharging rollers 36 to discharge the first sheet P1 to the sheet discharge tray 16. The controller 5 controls the second ASF motor 80M and the LF motor 35M to cause the second sheet P1 to feed from the first sheet feed tray 15 toward the pair of conveying rollers 35, and conveys the second sheet P1 to the print start position for performing printing in a first print pass after the leading edge registration. The print start position of the second sheet P1 is an example of a "second printing position". A feeding start timing may be different based on whether a rear end of the first sheet P1 has already passed through the pair of conveying rollers 35 when the printing on the first sheet P1 is completed. Since the feeding of the second sheet P1 has already been started at this time, the feeding is continued and the cueing is performed.

In S10, the controller 5 determines whether the cued second sheet P1 is detected. The sensor 45 may detect the second sheet P1 in a case where the carriage 51 is disposed at the right side detection position and the second sheet P1 is normally conveyed to the print start position. If the controller 5 determines that the cued second sheet P1 is detected based on detection result of the sensor 45 (YES in S10), the controller 5 proceeds to a step S11. If the controller 5 determines that the cued second sheet P1 is not detected (NO in S10), the controller 5 notifies an error such as a failure of the sensor 45 and a sheet jam, and ends the processes of FIG. 5. Alternatively, in a case where the error is a jam of the second sheet P1, the controller 5 may cause the second sheet P1 to feed to the pair of conveying rollers 35, perform the leading edge registration, and perform processes of FIG. 5 from the step S9 after the jammed sheet P1 is removed.

In S11, the controller 5 controls the carriage motor 50M to cause the carriage 51 to move from the right detection position to a right print start position. Then, the controller 5 proceeds to a step S15.

In S12, the controller 5 controls the carriage motor 50M to move the carriage 51 from the print end position in the final print pass to a left side detection position. In parallel with moving of the carriage 51, the controller 5 performs the discharging operation of the first sheet P1 and cueing of the second sheet P1. The controller 5 controls the first ASF motor 20M and the LF motor 35M to cause the pair of discharging rollers 36 to discharge the first sheet P1 to the sheet discharge tray 16. The controller 5 controls the second ASF motor 80M and the LF motor 35M to cause the second sheet P1 to feed from the first sheet feed tray 15 toward the pair of conveying rollers 35, and conveys the second sheet P1 to the print start position for performing printing in a first print pass after the leading edge registration.

In S13, the controller 5 determines whether the cued second sheet P1 is detected. The sensor 45 may detect the second sheet P1 in a case where the carriage 51 is disposed at the left side detection position and the second sheet P1 is normally conveyed to the print start position. If the controller 5 determines that the cued second sheet P1 is detected based on detection result of the sensor 45 (YES in S13), the controller 5 proceeds to a step S14. If the sensor 45 determines that the cued second sheet P1 is not detected (NO in S13), the controller 5 notifies an error such as a failure of the sensor 45 and a sheet jam, and ends the processes of FIG. 5. Alternatively, in a case where the error is a jam of the second sheet P1, the controller 5 may cause the second sheet P1 to feed to the pair of conveying rollers 35, perform the leading edge registration, and perform processes of FIG. 5 from the step S12 after the jammed sheet P1 may be removed.

In S14, the controller 5 controls the carriage motor 50M to cause the carriage 51 to move from the left side detection position to a left side print start position.

In S15, the controller 5 controls the carriage motor 50M, the inkjet head 41, and the LF motor 35M to print an image on the second sheet P1 based on the second print data.

In S16, the controller 5 determines whether printing in the final print pass is completed. Until the printing in the final print pass is completed (NO in S16), the controller 5 continues the printing and repeats the step S16. If the printing in the final print pass is completed (YES in S16), the controller 5 proceeds to a step S17.

In S17, the controller 5 controls the carriage motor 50M and the LF motor 35M to cause the pair of discharging rollers 36 to discharge the second sheet P1 to the discharging tray 16, and the carriage 51 to move to the standby position.

The printer 1 is an example of the "liquid discharging apparatus". Each of the first sheet feed portion 20, the second feeding portion 80, the pair of conveying rollers 35, and the pair of discharging rollers 36 is an example of the "conveying mechanism". The pair of conveying rollers 35 is an example of a "conveying mechanism". The inkjet head 41 is an example of the "liquid ejection head". The head moving mechanism 50 is an example of the "moving mechanism". The controller 5 is an example of the "controller".

According to this embodiment, if the interval, i.e., the period between a first timing from which the first sheet P1 is discharged in response to finishing printing process for the first sheet P1 and a second timing at which the second sheet P1 is set at the print start position, is more than the predetermined time, conveying of the second sheet P1 to the print start position may be delayed. In this case, the controller 5 causes the carriage 51 to move to the right side detection position. The distance between the right side detection position and the right side print start position is less than the distance between the left side detection position and the left side print start position. That is, moving period of the carriage 51 from the right side detection position to the right side print start position may be less. Accordingly, a period between completion of printing of the first sheet P1 and completion of printing of the second sheet P1 may be less.

If the interval is less than the predetermined period (NO in S7), in S8, the controller 5 further determines the moving direction of the carriage 51 in the final print pass for the first sheet P1. If the controller determines that the carriage 51 moves rightward in the final print pass for the first sheet P1 (NO in S8), the controller 5 causes the carriage 51 to move to the right side detection position (S9). Accordingly, moving period of the carriage 51 from the print end position to the right side detection position may be less, thereby decreasing the period between completion of printing of the first sheet P1 and completion of printing of the second sheet P1.

The controller 5 determines whether the interval is more than the predetermined period based on whether the first sheet P1 is nipped by the pair of conveying rollers 35 when printing in the final print pass is completed. Accordingly, the controller 5 does not need to calculate a certain period for the determination of the step S7, thereby simplifying the process of the step S7.

Hereinafter, a first modification will be described. In the above embodiment, if it is determined that the interval is more than the predetermined period (YES in S7), the controller 5 causes the carriage 51 to move to the right side detection position. In the first modification, the controller 5 determines a rightward moving period TR and a leftward moving period TL. The rightward moving period TR is a period for causing the carriage 51 to move from a print end position to the right side print start position via the right side detection position. The leftward moving period TL is a period for causing the carriage 51 to move from the print end position to the left side print start position via the left side detection position. The print end position is a position where the carriage 51 is located when printing of the image on the first sheet P1 is completed. The controller 5 causes the carriage 51 to move either of the right side print start position or the left side print start position based on the determined rightward moving period TR and the leftward moving period TL. The same configurations as those in the above embodiment are indicated by the same reference numbers, and the description thereof will be omitted.

Figure 8:
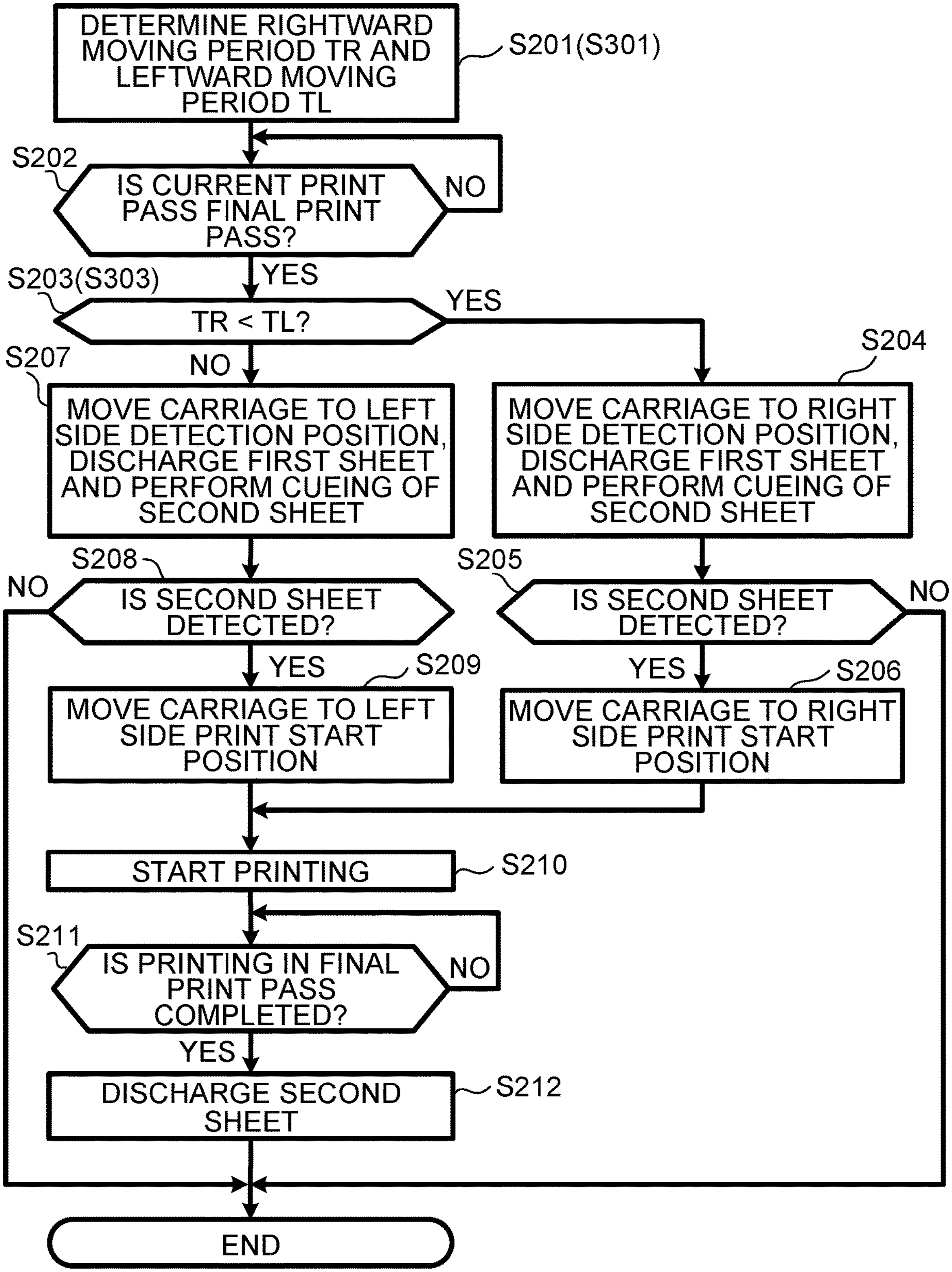
FIG. 8 is a flowchart illustrating printing operations of the printer of another embodiment of the disclosure.

In the first modification, as illustrated in FIG. 8, the controller 5 executes a step S201 after the controller 5 receives the print data as the step S1 of FIG. 5. In S201, the controller 5 determines the rightward moving period TR and the leftward moving period TL based on the received print data including the first print data and the second print data. The rightward moving period TR includes a rightward detection period TR1 and a rightward preparation period TR2. The rightward detection period TR1 is a period for causing the carriage 51 to move from the print end position at which printing in the final print pass is completed to the right side detection position. The rightward preparation period TR2 is a period for causing the carriage 51 to move from the right side detection position to the right side print start position. The leftward moving period TL includes a leftward detection period TL1 and a leftward preparation period TL2. The leftward detection period TL1 is a period for causing the carriage 51 to move from the print end position to the left side detection position. The leftward preparation period TL2 is a period for causing the carriage 51 to move from the left side detection position to the left side print start position.

The controller 5 further determines a conveying period T2 and a conveying period T3. The conveying period T2 is a period between a timing from which discharging of the first sheet P1 starts and a timing at which downstream end of the fed second sheet P1 reaches to the pair of conveying rollers 35. The conveying period T3 is a period for causing the second sheet P1 to feed such that the downstream end of the second sheet P1 is moved from the pair of conveying rollers 35 to the print start position. In a case where the second sheet P2 is conveyed, the controller 5 determines a conveying period T4. The conveying period T4 is a period between a timing from which discharging of the first sheet P1 starts and a timing at which downstream end of the fed second sheet P2 reaches to the pair of conveying rollers 35. The conveying period T4 may be more than the conveying period T2 due to a difference of the conveying distance. Further, the conveying period T2 may be longer in a case where the start of feeding delays due to the downstream end of the second sheet P1 being apart from the pair of the conveying rollers 35 when discharging of the first sheet P1 starts. The conveying period T4 may also be longer in a case where the start of feeding delays due to the downstream end of the second sheet P2 being apart from the pair of the conveying rollers 35 when discharging of the first sheet P1 starts. That is, the interval T1 may be longer in the case where the start of feeding delays. In the case where the second sheet P1 is fed, the controller 5 adds the conveying period T2 and the conveying period T3 to obtain the interval T1. On the other hand, in the case where the second sheet P2 is fed, the controller 5 adds the conveying period T4 and the conveying period T3 to obtain the interval T1. Accordingly, the controller 5 obtains the interval T1 based on the first print data and the second print data. In this modification, the feeding of the second sheet P1 starts at either of a timing at which printing of the final print pass starts in a case where the start of feeding delays or a timing at which printing of the print pass before, or immediately before, the final print pass starts in a case where the start of feeding does not delay.

In a case where the period obtained by subtracting the interval T1 from the rightward detection period TR1 is positive, the controller 5 sets the subtracted period of "TR1-T1" as the rightward detection period TR1. In this case, the controller 5 adds the rightward detection period TR1 and the rightward preparation period TR2 to obtain the rightward moving period TR. On the other hand, in a case where the period obtained by subtracting the interval T1 from the rightward detection period TL1 is negative or 0, the controller 5 sets "0" as the rightward detection period TR1. The reason why the rightward detection period TR1 is set to "0" is that the carriage 51 may reach the right side detection position from the print end position before the second sheet P1 is conveyed to the print start position. In this case, the controller 5 adds "0" of the rightward detection period TR1 and the rightward preparation period TR2 to obtain the rightward moving period TR.

In a case where the period obtained by subtracting the interval T1 from the leftward detection period TL1 is positive, the controller 5 sets the subtracted period of "TL1-T1" as the leftward detection period TL1. In this case, the controller 5 adds the leftward detection period TL1 and the leftward preparation period TL2 to obtain the leftward moving period TL. On the other hand, in a case where the period obtained by subtracting the interval T1 from the leftward detection period TL1 is negative or 0, the controller 5 sets "0" as the leftward detection period TL1. The reason why the leftward detection period TL1 is set to "0" is that the carriage 51 may reach the left side detection position from the print end position before the second sheet P1 is conveyed to the print start position. In this case, the controller 5 adds "0" of the leftward detection period TL1 and the leftward preparation period TL2 to obtain the leftward moving period TL.

In S202, the controller 5 determines whether a current print pass for the first sheet P1 is the final print pass. If the controller 5 determines that the current print pass is not the final print pass (NO in S202), the controller 5 continues the printing and repeats the step S202. If the controller 5 determines that the current print pass is the final print pass (YES in S202), the controller 5 proceeds to a step S203. In S203, the controller 5 determines whether the rightward moving period TR is less than the leftward moving period TL. If the rightward moving period TR is less than the leftward moving period TL (YES in S203), the controller 5 proceeds to a step S204. On the other hand, if the rightward moving period TR is equal to or more than the leftward moving period TL (NO in S203), the controller 5 proceeds to a step S207.

In S204, the controller 5 controls the carriage motor 50M to cause the carriage 51 to move from the print end position to the right side detection position. In parallel with moving of the carriage 51, the controller 5 performs the discharging operation of the first sheet P1 and cueing of the second sheet P1.

In S205, the controller 5 determines whether the second sheet P1 is detected based on the detection result of the sensor 45. If the controller 5 determines that the second sheet P1 is detected (YES in S205), in S206, the controller 5 controls the carriage motor 50M to cause the carriage 51 to move from the right side detection position to the right side print start position. If the controller 5 determines that the second sheet P1 is not detected (NO in S205), the controller 5 notifies an error such as a failure of the sensor 45 and a sheet jam, and ends the processes of FIG. 8. Alternatively, in a case where the error is a jam of the second sheet P1, the controller 5 may cause the second sheet P1 to feed to the pair of conveying rollers 35, perform the leading edge registration, and perform processes of FIG. 8 from the step S204 after the jammed second sheet P1 may be removed.

In S207, the controller 5 controls the carriage motor 50M to cause the carriage 51 to move from the print end position to the left side detection position. In parallel with moving of the carriage 51, the controller 5 performs the discharging operation of the first sheet P1 and cueing of the second sheet P1.

In S208, the controller 5 determines whether the second sheet P1 is detected based on the detection result of the sensor 45. If the controller 5 determines that the second sheet P1 is detected (YES in S208), in S209, the controller 5 controls the carriage motor 50M to cause the carriage 51 to move from the left side detection position to the left side print start position. If the controller 5 determines that the second sheet P1 is not detected (NO in S208), the controller 5 notifies an error such as a failure of the sensor 45 and a sheet jam, and ends the processes of FIG. 8. Alternatively, in a case where the error is a jam of the second sheet P1, the controller 5 may cause the second sheet P1 to feed to the pair of conveying rollers 35, perform the leading edge registration, and perform processes of FIG. 8 from the step S207 after the jammed second sheet P1 may be removed.

In S210, the controller 5 controls the carriage motor 50M, the inkjet head 41, and the LF motor 35M to print an image on the second sheet P1. In S211, the controller 5 determines whether printing in the final print pass is completed. If the controller 5 determines that the printing in the last pass is not completed (NO in S211), the controller 5 continues the printing and repeats the step S211. If the controller 5 determines that the printing in the final print pass is completed (YES in S211), the controller 5 proceeds to a step S212. In S212, the controller 5 controls the carriage motor 35M and the LF motor 35M to cause the pair of discharging rollers 36 to discharge the second sheet P1 to the discharging tray 16, and the carriage 51 to move to the standby position.

According to the first modification, the controller 5 causes the carriage 51 to move either of the right side detection position or the left side detection position based on the rightward moving period TR and the leftward moving period TL, thereby reducing the moving period of the carriage 51. Accordingly, a period between a timing at which printing of the first sheet P1 is completed and a timing at which printing of the second sheet P1 is completed may be less.

In S201, the controller 5 obtains the rightward moving period TR and the leftward moving period TL based on the interval T1 by considering the feed start delay, thereby enabling to determine the rightward moving period TR and the leftward moving period TL correctly.

Alternatively, the controller 5 may obtain the rightward detection period TR1 by subtracting the conveying period T3 from the rightward detection period TR1 if the subtracting period is positive, and may obtain the rightward detection period TR1 as "0" if the subtracting period is negative or 0. Alternatively, the controller 5 may obtain the leftward detection period TL1 by subtracting the conveying period T3 from the leftward detection period TL1 if the subtracting period is positive, and may obtain the leftward detection period TL1 as "0" if the subtracting period is negative or 0. Accordingly, the controller 5 may obtain the rightward moving period TR and the leftward moving period TL by considering the conveying period T3 of the second sheet P1.

Hereinafter a second modification will be described. In the first modification, in S201, the controller 5 obtains the rightward moving period TR by adding the rightward detection period TR1 and the rightward preparation period TR2, and the leftward moving period TL by adding the leftward detection period TL1 and the leftward preparation period TL2. Alternatively, in the second modification, the controller 5 may obtain the rightward moving period TR by adding a rightward printing period TR3, and the leftward moving period TL by adding a leftward printing period TL3. The same configurations as those in the first modification are indicated by the same reference numbers, and the description thereof will be omitted.

In the second modification, in S301 of FIG. 8 illustrated in brackets, the controller 5 obtains rightward moving period TR and the leftward moving period TL. The rightward moving period TR includes the rightward detection period TR1, the rightward preparation period TR2, and the rightward printing period TR3. The leftward moving period TL includes the leftward detection period TL1, the leftward preparation period TL2, and the leftward printing period TL3. The rightward printing period TR3 is a printing period between a timing from which printing of the second sheet P1 starts while moving the carriage 51 leftward from the right side print start position along the left-right direction A3 and a timing at which printing of the second sheet P1 ends, i.e., discharging ink from the inkjet head 41 in the final print pass for the second sheet P1 ends. The leftward printing period TL3 is a printing period between a timing from which printing of the second sheet P1 starts while moving the carriage 51 rightward from the left side print start position along the left-right direction A3 and a timing at which printing of the second sheet P1 ends, i.e., discharging ink from the inkjet head 41 in the final print pass for the second sheet P1 ends. The rightward printing period TR3 and the leftward printing period TL3 are obtained based on the second print data.

In S303, the controller 5 determines whether the rightward moving period TR is less than the leftward moving period TL. If the rightward moving period TR is less than the leftward moving period TL (YES in S303), the controller 5 proceeds to the step S204. On the other hand, if the rightward moving period TR is equal to or more than the leftward moving period TL (NO in S303), the controller 5 proceeds to the step S207. The subsequent steps are the same as those in the first modification.

According to the second modification, the controller 5 obtains the rightward moving period TR by considering the rightward printing period TR3, and the leftward moving period TL by considering the leftward printing period TL3. For example, the rightward printing period TR3 is much more than the leftward printing period TL3, the controller 5 may determines in the step S303 that the rightward moving period TR is more than the leftward moving period TL even if the period of "TR1+TR2" is less than the period of "TL1+TL2". Accordingly, a period between the timing at which printing of the first sheet P1 is completed and the timing at which printing of the second sheet P1 is completed may be less.

The above embodiments are merely examples. Various modifications may be applied therein without departing from the spirit and scope of the disclosure. The controller 5 may execute one or two determination processes in S7 of FIG. 5 instead of executing all of the three determination processes. The controller 5 may determine whether the interval is more than the predetermined period based on the one or two determination processes, instead of all of the three determination processes.

The controller may obtain the rightward detection period TR1 and the leftward detection period without subtracting the interval T1 therefrom. This modification may obtain the same effect as that of the first modification.

The sensor 45 is disposed on a left side in the left-right direction A3 with respect to the plurality of nozzles 41A. In this modification, the right side and the left side in the embodiment and the above modifications may be switched.

The controller 5 may detect whether the sheet P1 has been conveyed to the pair of conveying rollers 35 based on a sheet detection sensor disposed adjacent to the pair of conveying rollers 35, instead of calculating the amount of conveying of the sheet.

A liquid ejection head that eject liquid other than ink may be attached to the printer 1.

What is claimed is:

1. A liquid ejection apparatus comprising:

a liquid ejection head including a nozzle configured to eject liquid;

a sensor configured to detect a first sheet and a second sheet each of which is conveyed in a conveying direction;

a carriage configured to support the liquid ejection head and the sensor, and move in a scanning direction intersecting with the conveying direction, the scanning direction including a first direction and a second direction opposite to the first direction, the sensor being upstream of the liquid ejection head when the liquid ejection head moves in the first direction;

a controller configured to perform:

setting the first sheet at a printing position in response to conveying the first sheet in the conveying direction;

printing an image on the first sheet while conveying the first sheet from the printing position, the image is printed on the first sheet in a plurality of printing passes, causing the carriage to move alternately along either of the first direction or the second direction in each of the plurality of printing passes;

determining, while the printing the image on the first sheet is performed, based on at least one of a first condition, a second condition or a third condition, whether an interval is more than a predetermined period, the interval indicating a period between a first timing at which the printing of the image on the first sheet is completed and a second timing at which the second sheet is set at the printing position in response to conveying the second sheet in the conveying direction;

in response to the interval being determined to be more than the predetermined period:

causing the carriage to move in the first direction to a first detection position at which the second sheet is detected; and in response to detecting the second sheet, causing the carriage to move in the first direction from the first detection position to a first carriage position wherein in response to the interval being determined not to be more than the predetermined period, the controller is configured to perform:

determining a moving direction of the carriage at a last printing pass of the plurality of printing passes; and in response to the moving direction of the carriage at the last printing pass being determined to be the first direction:

causing the carriage to move in the first direction to the first detection position; and in response to detecting the second sheet, causing the carriage to move in the first direction from the first detection position to the first carriage position, and in response to the moving direction being determined to be the second direction:

causing the carriage to move in the second direction to a second detection position at which the second sheet is detected, wherein the second detection position is different from the first detection position; and in response to detecting the second sheet, causing the carriage to move in the second direction from the second detection position to a second carriage position, wherein the first carriage position is different from the second carriage position; and starting printing of the image on the second sheet by causing the carriage to move in the first direction from the second carriage position.

2. The liquid ejection apparatus according to claim 1, further comprises a pair of conveying rollers that is located at upstream of the liquid ejection head in the conveying direction, and wherein the controller is configured to determine that the interval is more than the predetermined period in a case where an upstream end of the first sheet has not passed the pair of conveying rollers when the printing of the image on the first sheet is completed.

3. The liquid ejection apparatus according to claim 1, wherein the carriage is configured to move between a first position and a second position in the scanning direction, where the first position is farther from the first detection position than the second position, and wherein the predetermined period is based on a time it takes to move the carriage to the first detection position from the first position and a time it takes to convey the second sheet to the printing position.

4. The liquid ejection apparatus according to claim 1, wherein the first carriage position is a position where the nozzle does not overlap the second sheet.

* * * * *